Patented Aug. 24, 1954

2,687,400

UNITED STATES PATENT OFFICE 2,687,400

POLYMERS AND COPOLYMERS OF N-PYRIDYL ITACONIC AMIDE

Gaetano F. D'Alelio, Pittsburgh, Pa., assignor to Koppers Company, Inc., a corporation of Delaware No Drawing. Application August 31, 1951, Serial No. 244,690

14 Claims. (Cl. 260—78)

This invention relates to new monomers and to new polymeric materials derived therefrom and is particularly directed to the polymerization products obtained by polymerizing a mass comprising as a new monomer an amide of a polymerizable ethylenic carboxylic acid and a basic nitrogenous compound containing a basic tertiary nitrogen group and an amide-forming amino group, in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that improvement in dyeing properties of acryonitrile polymers are obtained by the polymerization of polymerizable masses comprising acrylonitrile and an amide of a polymerizable ethylenic carboxylic acid and a basic nitrogenous compound containing a basic tertiary nitrogen group and an amide-forming amino group with or without other copolymerizable ethylenic compounds. It has been found further that in addition to the fact that an amide of a polymerizable ethylenic carboxylic acid and a basic nitrogenous compound containing a basic tertiary nitrogen group and an amide-forming amino group yield particularly valuable copolymers with acrylonitrile, they may also be used effectively to form copolymers with other types of copolymerizable ethylenic compounds. It has been found still further that an amide of a basic nitrogenous compound containing a basic tertiary nitrogen group and an amide-forming amino group and those polymerizable ethylenic carboxylic acids which form homo-polymers can be polymerized to form useful homo-polymers. Thus it has been found that valuable polymerization products may be prepared in accordance with the invention by polymerizing a mass comprising an amide of a polymerizable ethylenic carboxylic acid and a basic nitrogenous compound containing a basic tertiary nitrogen group and an amide-forming amino group either in the presence or absence of other ethylenic copolymerizable compounds such as acrylonitrile and other copolymerizable ethylenic compounds such as listed hereinafter.

The amides used in the practice of the invention may be formed by reacting a basic nitrogenous compound containing a basic nitrogen atom and an amide-forming amino group with a polymerizable ethylenic carboxylic acid or anhydride such as itaconic acid, itaconic acid anhydride, itaconic acid monoesters, itaconic acid monoamides, acrylic acid, alpha-methacrylic acid, beta-cyano-acrylic acid, maleic acid, maleic acid monoesters, and maleic acid monoamides. The acyl chlorides, or other halides, of these acids may be used also. When dibasic acids or the anhydrides thereof are used, one of the carboxylic groups can be esterified before the amidation. Another amide group similarly may be introduced before the amidation instead of an ester group. Likewise when the dibasic acids or anhydrides thereof are used, the amidation may be carried either to the mono- or diamide stages. If carried to the mono stage only, the remaining carboxylic acid group may then be esterified or amidated as desired. In these and other ways known to those skilled in the art amides of polymerizable ethylenic carboxylic acids and basic nitrogenous compounds containing a basic tertiary nitrogen atom and an amide-forming group may be readily formed.

The itaconic acid amides used in the invention may be represented by the general formula

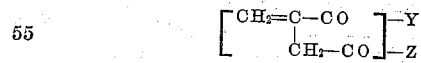

in which Z is the residue obtained by removing the replaceable hydrogen from the amino group of a basic nitrogenous compound containing a basic tertiary nitrogen atom and an amide-forming amino group, and Y is selected from the class consisting of the radical Z and the radicals RO— and R₂N— in which R is hydrogen or the alkyl, aryl, aralkyl, alkaryl or cycloaliphatic groups, which may have halogen-, acyloxy-, or alkoxy-substituents, and when Y is R₂N the R's may be linked together to form with the nitrogen a heterocyclic group such as the piperidyl, piperazine or morpholino groups.

The acrylic acid amides and the cyano-acrylic acid amides used in the practice of the invention may be represented by the general formula

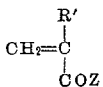

and

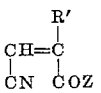

in which R' is hydrogen or the methyl group and Z is as above described.

The maleic acid amides used in the practice of the invention may be represented by the formula

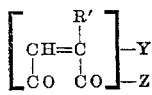

in which R', Y, and Z are as above indicated.

When the amides used in the practice of the invention contain an ester group or an amide group other than group Z, the radical R may be methyl, ethyl, propyl, isopropyl, n-butyl, sec-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, chloro-cyclohexyl, phenyl, chloro-phenyl, xenyl, naphthyl, tolyl, chloro-tolyl, xylyl, ethyl-phenyl, propyl-phenyl, isopropyl-phenyl, benzyl, chloro-benzyl, phenethyl, phenyl-propyl, phenyl-butyl, acetoxy-ethyl, acetoxy-phenyl, acetoxy-benzyl, acetoxy-tolyl, acetoxy-cyclohexyl, chlorophenoxy-ethyl, acetoxy-propyl, acetoxy-isopropyl, methoxy-propyl, ethoxy-propyl, methoxy-phenyl, methoxy-benzyl, methoxy-tolyl, methoxy-cyclohexyl, etc. or part of a heterocyclic amino group, such as, the piperidyl, piperazino, and morpholino groups.

The basic nitrogenous compounds from which the radical Z is derived are those basic nitrogenous compounds which contain a basic tertiary nitrogen atom and an amide-forming amino group. Any basic nitrogenous compound containing a basic tertiary nitrogen atom and an amino group having a replaceable hydrogen will yield such a residue and may be utilized in forming the amides used in the practice of the invention.

These basic nitrogenous compounds may be aliphatic, alicyclic, aromatic, or heterocyclic nitrogenous bases. They may contain any number of basic tertiary nitrogen atoms but preferably are free of hydroxy groups or other amide-forming amino groups when unesterified monoamides are used because otherwise crosslinking may result. Although any such nitrogenous bases containing tertiary nitrogen atoms and the necessary amide-forming amino group may be utilized to form the amides used in the practice of this invention, it is generally not desirable to use strongly basic compounds as, for example, those of the aliphatic and alicyclic series because such strong bases are likely to impart undesirable aging and discoloring characteristics to the polymerization products produced. Thus in preparing the amides used in the practice of this invention there may be used such basic nitrogenous compounds as amino-pyridine and amino-quinoline and their chloro, bromo, amino, hydroxy, alkyl and aryl derivatives as well as the corresponding hydrogenated derivatives such as piperidine in which the hydrogen on the ring nitrogen is replaced by an alkyl or other group to give a tertiary base; amino-pyrimidine and amino-quinazoline and their chloro, bromo, amino, hydroxy, alkyl and aryl derivatives as well as the corresponding hydrogenated derivatives which contain a basic tertiary nitrogen group; guanazole and its alkyl and aryl derivatives; and amino-N,N-dialkylanilines and their chloro, bromo, amino, hydroxy, alkyl and aryl derivatives. Suitable compounds include para-amino-N,N-dimethylaniline, beta-aminopyridine, 4-aminopyrimidine, 4-amino-2,6-dimethylpyrimidine, guanazole, phenyl guanazole, N-methyl-2-piperazine, and N-methyl amino-morpholine.

For the most part, the basic nitrogenous compounds which are most effective for forming the amides utilized in this invention are those which have their tertiary nitrogen atom attached to a double bonded carbon atom of an unsaturated ring structure, as, for example, in the structures

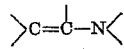

or

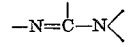

Such structures are commonly characterized in that the tertiary nitrogen atom is subject to being polarized by a tautometric mechanism. See Remick, Electronic Interpretations of Organic Chemistry, 1st edition, page 62 et seq. This coupled with the polarization due to the electronegativity of the double bonded carbon reduces the basicity of the tertiary nitrogen atom. Basic nitrogenous bases thus commonly characterized are the pyridines, quinolines, pyrimidines, quinazolines, guanazoles and dialkylanilines listed above as may be seen from the following structures:

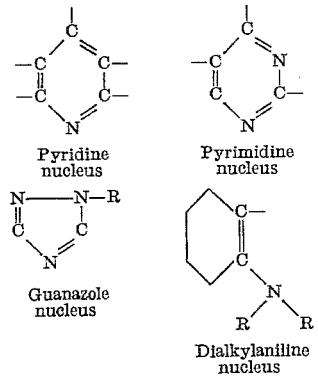

In all these cases, one and only one valence of the tertiary nitrogen atom is satisfied by a ring carbon atom which is double bonded to another ring atom. It will be observed that two such groups are found in the pyrimidine nucleus and two also in the guanazole nucleus when R is other than hydrogen. It is believed that these groups contribute to the stability and degree of basicity desirable in the preferred after-treating agents of this invention. In any event basic nitrogenous compounds which contain such groups in addition to the necessary amide-forming groups yield superior after-treated products. Thus in the preferred form of the invention the radical Z of the general formula given above has its tertiary nitrogen atom attached to a double bonded carbon atom in an unsaturated ring structure.

A preferred class of amides used in the practice of this invention is that in which the above mentioned unsaturated ring structure is the pyridine nucleus. Amides of this type are referred to herein as N-pyridyl acrylic acid amides, N-pyridyl cyanoacrylic acid amides, N-pyridyl maleic acid amides, and N-pyridyl itaconic acid amides. The latter is represented by the formula

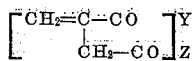

in which the radical Y is as given above and Z is the radical

in which R'' is selected from the class consisting of hydrogen and alkyl groups, such as, methyl, ethyl, isopropyl, n-butyl, sec-butyl, amyl, hexyl, decyl, and the like, preferably containing less than five carbon atoms and P is a pyridine nucleus. The pyridine nucleus may be substituted or unsubstituted. If substituted, it is preferred that the substituents be hydrocarbon group or groups containing not more than a total of five carbon atoms as in the case of the monoethyl pyridines, the dimethyl pyridines, the diethyl pyridines, the methyl ethyl pyridines, isoquinoline, quinoline, and the alkylated quinolines such as quinaldine.

For reasons of economy and ease of preparation, the methyl ester of N(2-pyridyl)-itaconic acid amide is usually preferred and has the formula

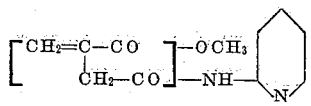

This monoester is prepared simply by refluxing methanol with itaconic acid in the presence of small amounts of an esterification catalyst such as sulfuric acid, toluene sulfonic acid, cation-exchange resins containing sulfonic acid groups, etc. The acid ester is then converted to the acid chloride by refluxing with thionyl chloride and thereafter reacted with amino pyridine to produce the methyl ester, N-pyridyl amide of itaconic acid.

The mono-acid N-pyridyl itaconic amide is conveniently prepared by reacting itaconic anhydride with the amino pyridine. This acid can be readily converted to a sodium or potassium salt and esterified with dimethyl or diethyl sulfate to the corresponding ester.

The proportions of the amide in the polymerization products of the invention may vary over a wide range, ranging from all or substantially all amide down to very small amounts of amide such as may be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 per cent and the susceptibility increases as the amount of amide is increased. Ordinarily sufficient improvement in dye susceptibility is obtained with amounts of amide ranging up to about 10 or 15 per cent but it may be advantageous for reasons such as in the preparation of ion-exchange polymers or as additives to improve dyeing properties, to have a major proportion of amide in the acrylonitrile copolymer. In such cases the concentration of amide may range up to or approaching 100 per cent. Within these proportions acrylonitrile copolymers of the invention show great affinity toward many dyes especially basic, acidic, vat, and cellulose acetate dyes.

In addition to the improvements effected in the resulting copolymers, the use of amides of polymerizable ethylenic carboxylic acids and the above described basic nitrogenous compounds has certain other advantages over the use of the acids. For example, the amides are more soluble in acrylonitrile than the acids. Thus it is generally easier to get complete copolymerization of the amide with acrylonitrile in solution, emulsion and suspension polymerizations. Still further advantages accrue from the presence of these amides. Thus when non-esterified monoamides are used the copolymers of the invention show high susceptibility to basic dyes.

The acrylonitrile copolymers discussed herein are soluble in N,N-dimethyl acetamide (DMA), N,N-dimethyl formamide (DMF), butyrolactone, ethylene carbonate and a number of similar solvents, used alone or in conjunction with N,N-dimethyl cyanamide, N,N-dimethyl cyano-acetamide, N,N-dimethyl methoxy-acetamide, methylene dinitrile, methylene di-thiocyanate, formyl caprolactam, formyl morpholine, tetramethylene sulfone, etc. N,N-dimethyl methyl urethane of the formula $(CH_3)_2NCOOCH_3$, ethylene carbamate, N-methyl-2-pyrrolidone, etc. may also be used as solvents either by themselves or with the secondary solvents mentioned above. Nitroalkanes, such as nitromethane, may be used as solvents for such copolymers having no more than about 85 per cent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

*Example I*

Five polymers of acrylonitrile are prepared from the following monomer compositions:

| Polymer | Acrylonitrile, parts | N-(2-pyridyl) itaconic amide acid, parts |
|---|---|---|
| A | 100 | |
| B | 99.9 | 0.1 |
| C | 95 | 5.0 |
| D | 90 | 10.0 |
| E | 80 | 0.0 |

The 100 parts of monomer or monomer mixture is, in each case, slowly added over a period of less than an hour to 750–1000 parts of distilled water at 30–50° C. containing dissolved therein one part of ammonium persulfate, 0.6 to 1.5 parts of sodium bisulfite and 0.5 part of sodium dodecyl-benzene sulfonate. The reaction is continued for 2–6 hours, at which time a yield of about 90 per cent solid polymer is precipitated. The resulting polymers have molecular weights over 10,000. Each polymer is dissolved in N,N-dimethyl acetamide or butyrolactone and a film cast from each solution.

A water solution of methylene blue dye (a basic dye) is prepared by making a paste of the dye and then diluting to a 1 per cent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film shows only a light tint, whereas the mono-N-(2-pyridyl) itaconic amide acid copolymers are a deep and dense shade. Identical films, cold-drawn and heat-treated, show dyeing characteristics similar to the undrawn films.

Bibers are spun from the same N,N-dimethyl acetamide or butyrolactone solutions either by dry spinning or by wet spinning, into glycerine baths. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the N(-2-pyridyl) itaconic acid amide copolymer fibers.

Instead of N(-2-pyridyl) itaconic amide acid, various other amides of polymerizable ethylenic carboxylic acids, as disclosed above, may be used.

Example II

Five polymers of acrylonitrile are prepared from the following monomer compositions:

| Polymer | Acrylonitrile, parts | Monomethyl N(-2-pyridyl) itaconic amide, parts |
| --- | --- | --- |
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecyl benzene sulfonate, 1.0 part of ammonium persulfate, 0.5 part of sodium bisulfite, and 100 parts of monomer or monomer mixture.

The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer (1 part) is dissolved in dimethyl formamide or butyrolactone and a film cast from the solution. The film is washed entirely free of solvent and stretched at a ratio of about 8:1 in a glycerine bath at 135 to 145° C. The film is then washed with water and dyed in a bath containing 0.05 part of 1,5-diamino-4,8-dihydroxyanthraquinone-3-sulfonic acid, 0.03 part sulfuric acid and 50 parts water (50:1 bath-film) ratio at boiling temperature for one hour. The film is then removed and washed with water and scoured for 15 minutes in a 0.4 per cent soap solution at 85° C. Whereas the unmodified polyacrylonitrile has little or no color, all of the copolymers are dyed to a deep blue shade.

Fibers are spun from the same solutions either by dry spinning, or by wet spinning. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Instead of the monomethyl ester of N-(2-pyridyl)-itaconic amide acid of the above example, various other monoesters of the itaconic amide acid may be used, such as the ethyl, propyl, isopropyl, butyl, isobutyl, tertiary-butyl, hexyl, tolyl, phenyl, naphthyl, cyclopentyl, cyclohexyl, benzyl, phenethyl monoesters of itaconic acid. Like monoesters of N-(2-pyridyl)-maleic amide acid may also be used. Also like monoesters of the monoamides of itaconic or maleic acid and the various tertiary nitrogen bases described above may be used.

Example III

Five parts of the copolymer fiber D of Example I are dyed to a green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating, 0.25 part of Glauber's salt was added. The sample fibers are then oxidized in a 0.5 per cent sodium dichromate-1.0 per cent acetic acid aqueous solution at 70° C. for 30 minutes in a 20:1 bath-fiber ratio. The dyed fibers are scoured in a 0.5 per cent boiling soap solution. A sample of yarn prepared from the unmodified polyacrylonitrile and dyed under the same conditions resulted in a light shade of color.

If 1,5 - di - p-anisoylamino-4,8-dihydroxy-anthraquinone is used as the vat dye, the fiber is dyed a strong violet color.

Example IV

The procedure of Example I is repeated for the polymerization of the following monomer compositions:

| Polymer | Acrylonitrile, Parts | Vinyl Chloride, Parts | Monomethyl N-(2-pyridyl) Itaconic Amide, Parts | Copolymer Soluble in— |
| --- | --- | --- | --- | --- |
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₂Me. |
| E | 57 | 40 | 3 | NO₂Me. |
| F | 37 | 60 | 3 | Acetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, dimethyl formamide, dimethyl acetamide, tetramethyl urea, etc. In addition, certain materials which are relatively poor solvents for polyacrylnitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example I.

Instead of monomethyl N(-2-pyridyl) itaconic amide, various other monoesters, as set forth in Example II, may be used.

*Example V*

The procedure of Example I is repeated for the polymerization of the following monomer compositions:

| Polymer | Acrylonitrile, Parts | Styrene, Parts | Monomethyl N(-2-pyridyl) itaconic amide, Parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example I. In place of styrene, various styrene derivatives may be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5- dichloro - styrenes, trichloro-styrenes; cyano-styrenes, such as ortho-, meta-, and para-cyano-styrenes, dicyano-styrenes; nuclear-substituted alkyl-styrenes, such as mono- and dimethyl-styrenes, mono- and di-ethyl-styrenes, mono- and di-isopropyl-styrenes; aryl-substituted styrenes, i. e., para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoromethyl-styrenes, such as ortho-, meta-, and para-trifluoromethyl-styrenes, di-(trifluoromethyl)-styrenes, and various other styrenes or mixtures of any number of these with each other or with styrene.

Instead of monomethyl N(-2-pyridyl) itaconic amide, various other monoesters, as set forth in Example II, may be used.

*Example VI*

The procedure of Example I is repeated for the polymerization of the following monomer compositions:

| Polymer | Acrylonitrile, Parts | Vinylidene Chloride, Parts | Monomethyl N-Quinolyl-itaconic amide, Parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 per cent in the polymer molecules, only the more active solvents, such as butyrolactone, N,N-dimethyl acetamide, N,N-dimethyl formamide, N,N,N',N'-tetramethyl urea, etc., can be used as solvents. The above copolymers dye more readily and thoroughly than similar copolymers containing no pyridyl-type amide.

*Example VII*

The procedure of Example I is repeated for the polymerization of the following monomer compositions:

| Polymer | Acrylonitrile, Parts | Vinylidene Chloride, Parts | Vinyl Chloride, Parts | Monoethyl N-(2-pyridyl) itaconic amide, Parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example I.

Instead of mono ethyl N(-2-pyridyl) itaconic amide, various other monoesters, as set forth in Example II, may be used.

Instead of copolymerizing the pyridyl amides, or like amides according to the invention with the acrylonitrile, the amides (except those of maleic acid which do not form homopolymers of high molecular weight) may be polymerized independently to produce homopolymers such as polypyridyl itaconic amides, and the prepared polymer used to modify polyacrylonitrile or other acrylonitrile copolymers. The acrylonitrile polymers may be blended with up to 10 per cent or more of the modifying polymers without serious loss in the physical or chemical properties of the resulting dyed structures. The following example is illustrative.

*Example VIII*

Polymeric monomethyl, N(-2-pyridyl) itaconic amide is prepared in accordance with the procedure of Example I. A 10 per cent solution of this polymer is prepared in dimethyl formamide and added to a dimethyl formamide solution of polyacrylonitrile, containing 20 per cent polymer so that a composition consisting of 90 parts of polyacrylonitrile and 10 parts of the pyridyl amide is obtained. The solution is heated to 130° C., after which the solution is filtered. Films and fibers prepared from this mixture are dyed in accordance with the process of Example I, and satisfactory dyed, shaped articles are obtained. The unmodified polyacrylonitrile without the addition of the pyridyl itaconic amide shows little or no dye retention.

Instead of using a homopolymer of N-pyridyl itaconic amide or like amide according to the invention, copolymers of the amide, including those of maleic acid, with other monomers, such as polymers D and E of Example II, may be used as modifiers for the homopolymers or copolymers of acrylonitrile. For example, polymer E of Example II, which consists of 80 parts of acrylonitrile and 20 parts of monomethyl N(-2-pyridyl) itaconic amide, has excellent compatibility with polymers of acrylonitrile and has little or no detrimental effect on the physical properties of the oriented fibers and films. In many cases, it is desirable to use as modifiers copolymers which have even a higher ratio of the amide, as for example, 50 to 70 parts of the itaconic amide copolymerized with acrylonitrile or methacrylonitrile. In other cases, the copolymers of the amides with other monomers are satisfactory such as, for example, copolymers of styrene, vinyl chloride, vinylidene chloride, alpha-methyl-styrene, etc.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus as there are present in the acrylonitrile copolymer, structural units derived from the acrylonitrile and styrene, it is desirable to have present in the modifying copolymer structural units derived from styrene in addition to those derived from acrylonitrile and the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The di-N-pyridyl itaconic amides of the structure $$CH_2=C-CON-P \atop \phantom{CH_2=}CH_2-CON-P$$
with R'' groups may be used instead of the monoamide in the practice of this invention.

The polymerization products of the present invention have in the polymer molecule a plurality of repeating units of the formulas $$\begin{bmatrix} -CH_2-C- \\ CH_2 \quad CO \\ CO \end{bmatrix}_Y \!\!\!-Z$$

or $$-CH_2-\underset{COZ}{\overset{R'}{C}}-$$

or $$\begin{bmatrix} -CH-\overset{R'}{C}- \\ CO \quad CO \end{bmatrix}_Y \!\!\!-Z$$

or $$-CH-\underset{CN \ COZ}{\overset{R'}{C}}$$

in which Y, Z, and R' are as indicated above and will contain additional repeating units of the formula $$-CH_2-CH- \atop CN$$

when the amide is copolymerized with acrylonitrile.

In addition, the copolymers may contain any number of repeating units of the type obtained by the copolymerization of the amide or a mixture of acrylonitrile and the amide with one or more copolymerizable ethylenic compounds, such as, for example, vinylidene chloride, vinyl chloride, styrene, alpha-methyl-styrene, methacrylonitrile, fumaronitrile, beta-cyanoacrylamide and methyl beta-cyano-acrylate.

As previously indicated, the solvent resistance of such copolymers as contain one or more monomer units in addition to those formed by the acrylonitrile and the amide is affected by the type and proportion of copolymerizing monomer or monomers used to replace part of the acrylonitrile. For example, copolymers containing small amounts of pyridyl itaconic units may contain various proportions of such monomer units as obtained from vinylidene chloride, methacrylonitrile, fumaronitrile, and beta-cyanoacrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile N-pyridyl itaconic amide type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the amides used in the practice of this invention include one or more of the following: acrylates, e. g. methyl acrylate; methacrylates, e. g. methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and substituted styrenes as listed in Example V, etc.

The polymerization products of this invention may be prepared by various polymerization systems, such as emulsion, suspension, mass and solution polymerizations. In addition to the monomers, the polymerizable mass may also contain other materials such as catalysts, e. g. peroxides, such as benzoyl peroxide, napthyl peroxides, phthalyl peroxide, tertiary-butyl hydroperoxide, hydrogen peroxide, cyclohexyl hydroperoxide, tertiary-butyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers may be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the copolymer is dissolved. For example, water, acetone, methyl alcohol, carbon disulfide, glycerine, choloroform, carbon tetrachloride, benzene, etc., may be used as a precipitating bath for N,N-dimethyl acetamide, N,N,N',N'-tetramethyl urea, butyrolactone and other solvent compositions of these copolymers. The extruded fibers, from which substantially all of the solvent has been removed in the spinning step, about 1-10 per cent remaining in the shaped article, may then be cold-drawn about 100-900 per cent, preferably about 300-600 per cent; and the drawn fiber heat-treated, usually at substantially constant length, at about 100-160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented, especially if there is no more than 15 per cent amide in the polymer molecule. This is true when the major portion of the copolymer is acrylonitrile, for example, 85 per cent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the pyridyl or other amide, the proportion of acrylonitrile in the copolymers may be much less than 85 per cent without destroying the capacity for molecular orientation. Molecularly oriented, cold-drawn, shaped articles of particular usefulness are prepared from copolymer compositions containing in the polymer molecules 60–99.9 per cent acrylonitrile, 0.1–15 per cent, advantageously 0.1–5 per cent, amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of 1 per cent or more.

The polymerization products of this invention show great affinity for the acetate, basic, acidic, and vat dyes. The cellulose acetate dyes which are effective with these polymerization products are mainly amino-anthraquinone derivatives. The basic dyestuffs toward which these polymerization products show great affinity are preferably those which contain amido, alkylamido, or ammonium groups, such as —$NH_2$, —$N(CH_3)_2$,

—$N(C_2H_5)_2$, —$NHC_6H_5$, —$N(CH_3)_3OH$ etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4'sulfophenyl), 3-methyl-5-pyrazolone; 1,5-diamino-4,8-dihydroxyanthraquinone-3-sulfonic acid; 1-aminonaphthalene-4-sulfonic acid→alphanaphthol-4-sulfonic acid; the sodium salt of sulfanilic acid→aniline→2-benzoyl-amino-5-naphthol-7-sulfonic acid; the sodium salt of 4,4,'-diaminostilbene-2,2'-di-sulfonic acid ⇌ (phenol)₂ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-aminobenzoic acid→o-anisidine) phosgenated; the sodium salt of (2-naphthol-6,8-disulfonic acid←benzidine→phenol)ethylated; dimethoxy-dibenzanthrone; and 1,5-di-p-anisoylamino-4,8-dihydroxyanthraquinone.

From the molecularly orientable copolymers of this invention fibers may be prepared having improved dyeing properties, low shrinkage in boiling water, sometimes as low as 3 to 5 per cent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application discloses subject matter in common disclosed and claimed in my presently copending applications Serial Numbers 244,691, 244,692, 244,696, 244,699, 244,704 and 244,706, all filed August 31, 1951; 364,506, 364,507, 364,508, 364,509, 364,512, 364,513, 364,514 and 364,515, all filed June 26, 1953; and 372,820 filed August 6, 1953.

I claim:

1. A polymerization product obtained by polymerizing a mass comprising N-pyridyl itaconic acid monoamide.

2. A polymerization product obtained by polymerizing a mass comprising the methyl ester of N-pyridyl itaconic acid monoamide.

3. A polymerization product obtained by polymerizing a mass comprising N,N'-di-pyridyl itaconic acid diamide.

4. The polymerization product of claim 2 which contains in the polymer molecule a plurality of repeating units of the formula

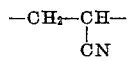

5. A cold-drawn fiber having molecular orientation, said fiber comprising a copolymer of about 60–98.9 per cent by weight acrylonitrile, about 0.1 to 5 per cent by weight N-pyridyl itaconic acid amide, and about 1 to 39.9 per cent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

6. A cold-drawn fiber having molecular orientation, said fiber comprising a copolymer of about 60–98.9 per cent by weight acrylonitrile, about 0.1 to 5 per cent by weight N-pyridyl itaconic acid amide and about 1 to 39.9 per cent by weight vinylidene chloride.

7. A cold-drawn fiber having molecular orientation, said fiber comprising a copolymer of about 60–98.9 per cent by weight acrylonitrile, about 0.1 to 5 per cent by weight N-pyridyl itaconic acid amide and about 1 to 39.9 per cent by weight vinyl chloride.

8. A cold-drawn fiber having molecular orientation, said fiber comprising a copolymer of about 60–98.9 per cent by weight acrylonitrile, about 0.1 to 5 per cent by weight N-pyridyl itaconic acid amide and about 1 to 39.9 per cent by weight styrene.

9. A cold-drawn fiber having molecular orientation, said fiber comprising a copolymer of about 60–98.9 per cent by weight acrylonitrile, about 0.1 to 5 per cent by weight of an amide having the following formula

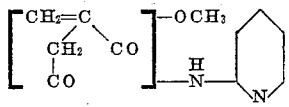

and about 1 to 39.9 per cent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

10. A polymeric composition having in the polymer molecule a plurality of repeating units having the formula selected from the class consisting of

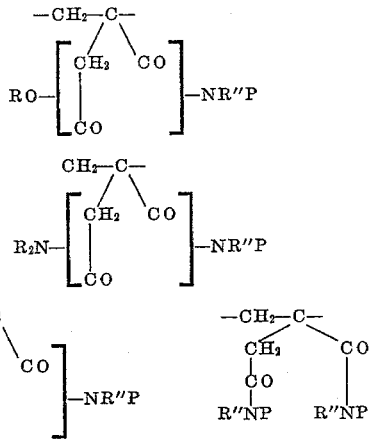

in which Y is selected from the class consisting of piperidyl, piperazino and morpholino; in which R is selected from the class consisting of hydrogen and alkyl, aryl, aralkyl, alkaryl, and cycloaliphatic groups, R'' is selected from the group consisting of hydrogen and alkyl groups containing not more than 3 carbon atoms, and P is the pyridyl group which can be substituted with hydrocarbon substituents containing not more than 5 carbon atoms.

11. A shaped article comprising a copolymer of acrylonitrile and N-pyridyl itaconic acid amide, said copolymer having a molecular weight of at least 10,000.

12. A cold-drawn fiber having molecular orientation, said fiber comprising a copolymer of acrylonitrile and N-pyridyl itaconic acid amide, said copolymer having a molecular weight of at least about 10,000 and containing in the polymer molecule no more than about 15 per cent by weight of said amide.

13. The polymerization product of 99.5–50 parts acrylonitrile and 0.1–50 parts of the methyl ester of N-(2-pyridyl) itaconamic acid.

14. A homopolymer of monomethyl N-(2-pyridyl) itaconic amide.

References Cited in the file of this patent

UNITED STATES PATENTS

| Number | Name | Date |
|---|---|---|
| 2,508,860 | Grimmel | May 23, 1950 |
| 2,531,410 | D'Alelio | Nov. 28, 1950 |
| 2,567,836 | Anthes | Sept. 11, 1951 |

FOREIGN PATENTS

| Number | Country | Date |
|---|---|---|
| 943,459 | France | 1948 |

OTHER REFERENCES

Maier, "Das Pyridin und seine derivate," 1934, p. 108.